(12) United States Patent
Moseley et al.

(10) Patent No.: US 11,327,040 B1
(45) Date of Patent: May 10, 2022

(54) HIGHLY EFFECTIVE SENSOR FOR THE VAPORS OF VOLATILE ORGANIC COMPOUNDS

(71) Applicant: Alphasense Ltd., Great Notley (GB)

(72) Inventors: Patrick T. Moseley, Chilton (GB); Peter Smith, Oxford (GB); John Saffell, Cambridge (GB)

(73) Assignee: Alphasense Ltd., Great Notley (GB)

( * ) Notice: Subject to any disclaimer, the term of this patent is extended or adjusted under 35 U.S.C. 154(b) by 0 days.

(21) Appl. No.: 16/245,372

(22) Filed: Jan. 11, 2019

Related U.S. Application Data

(60) Provisional application No. 62/616,074, filed on Jan. 11, 2018.

(51) Int. Cl.
*G01N 27/22* (2006.01)
*G01N 27/12* (2006.01)

(52) U.S. Cl.
CPC ......... *G01N 27/226* (2013.01); *G01N 27/123* (2013.01); *G01N 27/125* (2013.01); *G01N 27/227* (2013.01)

(58) Field of Classification Search
CPC .. G01N 27/226; G01N 27/227; G01N 27/125; G01N 27/123
See application file for complete search history.

(56) References Cited

U.S. PATENT DOCUMENTS

| | | | | |
|---|---|---|---|---|
| 5,607,573 | A * | 3/1997 | Miller | G01M 3/16 204/415 |
| 6,173,602 | B1 | 1/2001 | Moseley | |
| 8,470,665 | B2 * | 6/2013 | Yang | G11C 11/404 438/238 |
| 2004/0161949 | A1 * | 8/2004 | Yadav | C04B 35/00 438/800 |
| 2006/0263675 | A1 * | 11/2006 | Adzic | B01J 23/42 429/424 |
| 2017/0003238 | A1 * | 1/2017 | Salvador | C08L 33/12 |
| 2018/0208733 | A1 * | 7/2018 | Tayagaki | C08J 9/18 |
| 2020/0308014 | A1 * | 10/2020 | Oki | C09K 5/14 |

OTHER PUBLICATIONS

Ekstrom et al.; "Ternary Phases with the MO5O14 Type of Structure"; Acta Chemica Scandinavica, vol. 26 (1972).

\* cited by examiner

*Primary Examiner* — Akm Zakaria
(74) *Attorney, Agent, or Firm* — James Creighton Wray

(57) ABSTRACT

Molybdenum oxide is doped with vanadium, nobidium, tantalum or titanium to form a stable $M_5O_{14}$ theta phase crystal structure as a vapor sensitive material for detecting vapors of volatile organic compounds. That material is used between electrodes connected to a measuring device to measure a change in an electrical quality in the presence of a vapor of a volatile organic compound. Concentration of the vapor is measured to low part per million ranges.

10 Claims, 3 Drawing Sheets

HIGHLY EFFECTIVE SENSOR FOR THE VAPORS OF VOLATILE ORGANIC COMPOUNDS

This application claims the benefit of U.S. Provisional Application No. 62/616,074 filed Jan. 11, 2018, which is hereby incorporated by reference in its entirety as if fully set forth herein.

BACKGROUND OF THE INVENTION

The dominant technology for measuring the sum total of volatile organic compounds (VOCs) present in air is photo-ionisation detection (PID). However, the high price of PID instruments limits their uptake, and the product lifetime (5,000 hours/1 year) is a further disadvantage. PID instruments also are unable to detect toxic inorganic gases such as CO, $H_2S$, or $SO_2$, which are relevant to indoor safety. Metal oxide sensors offer a low-cost alternative and are sensitive to inorganic gases but, unlike PIDs, the metal oxide VOC sensors that have been available until now are generally composed of tin dioxide and suffer from humidity interference, leading to a signal with compromised accuracy or a signal requiring correction with an on-board humidity sensor, adding cost and complexity.

In U.S. Pat. No. 6,173,602 it was disclosed that $MO_{3-x}$, molybdenum trioxide doped with tantalum exhibits a sensitivity to the presence of the inorganic gases ammonia and hydrogen sulfide. U.S. Pat. No. 6,173,602 provides $MO_{3-x}$ where M is molybdenum containing a small amount of another metal with a valence of 5. That patent describes sensitivity to gases and vapors. Responses to gases are shown, and those responses are of relatively low sensitivity for high concentrations in air 1% CH4, 1% CO, 50 ppm H2S, 500 ppm NH3.

The need for sensors to detect and monitor gases and vapours in ambient air is widespread and growing. Particular requirements in this application are for a high sensitivity to target gases and vapours together with a freedom from the interference that could arise from changes in relative humidity and shifts in temperature—both factors that plague the use of electrochemical cells.

Needs exist for detecting vapors of volatile organic compounds in low concentrations down into ppm ranges with little interference from changes in relative humidity.

SUMMARY OF THE INVENTION

It now has been discovered that molybdenum oxide doped with sufficient vanadium or niobium or tantalum or titanium to form a stable $M_5O_{14}$ crystal structure, where M is predominantly molybdenum, exhibits an exceptional sensitivity to the vapours of volatile organic compounds, exemplified by isobutylene and benzene, the need for which sensitivity is specifically in demand for the monitoring of air quality.

The physical structure of the sensors described in U.S. Pat. No. 6,173,602 is incorporated herein as if fully set forth herein.

The new application is specifically based on doped molybdenum oxides with the theta phase crystal structure (see Acta Chemica Scandinavica, volume 26 (1972) 1827-1835). The structure is stable for oxides with a principal component of molybdenum and a minor component of titanium (4-valent), tantalum (5-valent) or vanadium (5-valent) or niobium (5 valent).

The material that results is especially interesting, as it is sensitive to volatile organic compounds (i.e. liquids with a high vapor pressure such as benzene, and isobutylene)—down into low ppm ranges and with little interference from changes in relative humidity. The new sensors provided a particularly strong response to permanent gases, such as methane, ethane, etc.

The new sensor material is an oxide with the theta phase crystal structure and showing abnormally high response to volatile organic compounds (VOCs).

The present invention relates to sensors and more particularly sensors suitable for use in air to detect vapors of volatile organic compounds with high vapor pressure. Examples of the vapors are benzene and isobutylene, which the new sensor material detects in concentrations down to low ppm, with little interference from relative humidity.

In a preferred embodiment, a sensor is provided that is suitable for use in air or another gas or gaseous mixture. The sensor includes a gas sensitive material that is capable of exhibiting a response in the form of an increase or a decrease in an electrical property of the material in the presence of large or small concentrations of vapors of volatile organic liquids that exhibits a small response to changes in the moisture content of the atmosphere.

The vapor sensitive material is provided with two or more electrodes in communication with the vapor sensitive material, and the vapor sensitive material is arranged so as to be capable of being contacted with a vapor in air or in other gas or gaseous mixture.

A sensor in accordance with the present invention may be used as a vapor sensor in quantitative and/or qualitative determinations of vapors of VOCs in air and other gases or gaseous mixtures. The electrodes may be in direct communication with the vapor sensitive material by being in contact therewith.

The sensitive material is a material which responds to a target organic vapor rather than to changes in relative humidity. In this specification the term "sensitive material" means a preferred material which is vapor sensitive in respect of an electrical property of the material.

An apparatus includes a sensor for detecting vapors of organic compounds, including plural electrodes and a vapor sensitive material in contact with each electrode. The vapor sensitive material is molybdenum oxide doped with sufficient vanadium, niobium, tantalum or titanium to form a stable $M_5O_{14}$ theta phase crystal structure, where M is predominantly molybdenum and which exhibits a response in the form of an increase or a decrease in an electrical property of the material in the presence of a vapor of volatile organic compound. The sensor detects vapor of a liquid volatile organic compound. The sensor detects ppm concentrations of isobutylene vapor in air.

The method includes effecting determination of a presence of a vapor from a volatile organic compound which includes providing a vapor sensor with plural electrodes. A vapor sensitive material is provided, and each electrode is in contact with the vapor sensitive material. The vapor sensitive material includes providing molybdenum oxide doped with sufficient vanadium, niobium, tantalum or titanium to form a stable $M_5O_{14}$ theta phase crystal structure, where M is predominantly molybdenum. The vapor sensitive material as herein before defined exhibits a response in the form of increasing or a decreasing an electrical property of the material in presence of the vapor of the volatile organic compound by detecting the change in electrical property by the vapor sensitive material, measuring the change in electrical property and determining the vapor concentration.

The method further includes sensing the vapor and determining the presence of the vapor of the volatile organic compound in the presence of humidity and oxidizing gases. One vapor is a vapor of a liquid organic compound. The measuring further includes measuring the resistance of the vapor sensitive material, measuring the capacitance of the vapor sensitive material or measuring impedance of the vapor sensitive material.

The method further includes detecting the vapor of the organic compound in the presence of air, humidity or oxidizing gases. The method includes detecting isobutylene and detecting benzene in air, as examples.

These and further and other objects and features of the invention are apparent in the disclosure, which includes the above and ongoing written specification, with the claims and the drawings.

DETAILED DESCRIPTION

Figure 1:
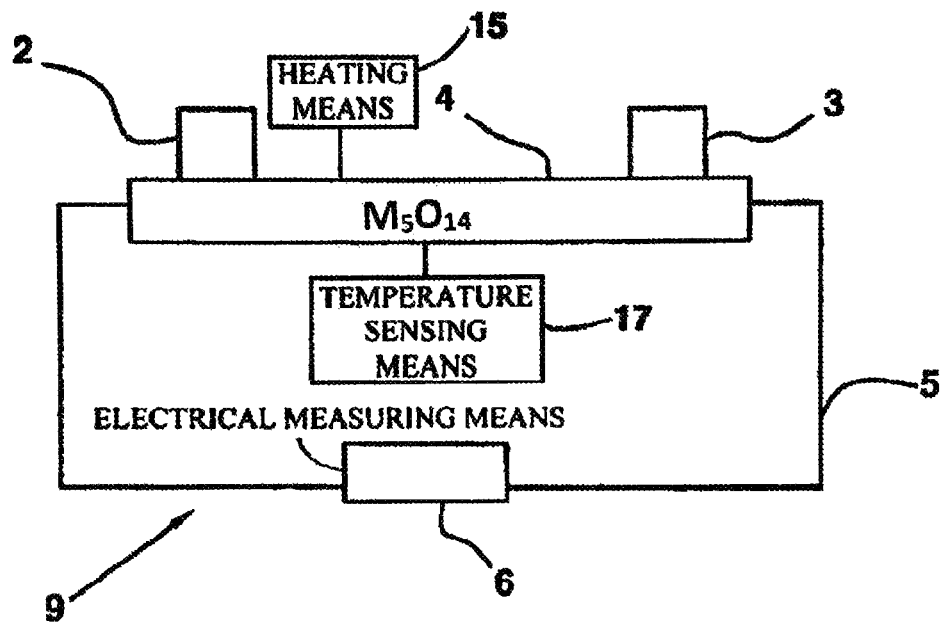
FIGS. 1-4 show examples of sensor structures and electrical components shown in U.S. Pat. No. 6,173,602.

FIG. 1 shows a sensor 9 comprising a gas sensitive material 4 and, in contact with the gas sensitive material, gold electrodes 2 and 3. The gas sensitive material may be carried by a substrate, e.g. of alumina, not shown.

Conductors 5 are provided to connect the electrodes 2 and 3 respectively to electrical measuring means 6 for measuring the resistance and/or capacitance, and/or impedance of the vapor sensitive material 4.

In operations vapor of a volatile organic compound in air or in a gaseous mixture is contacted with the vapor sensitive material 4.

The resistance and/or conductance, and/or impedance are measured by the electrical measuring means 6. Changes in the composition of the vapors which result in a change of resistance and/or conductance, and/or capacitance, and/or impedance are observed as changes in the resistance and/or conductance, and/or capacitance and/or impedance recorded by the measuring means 6. Sensor 9 may include a temperature sensor 17 for sensing temperature and a heater 15 for heating the sensor.

Figure 2:
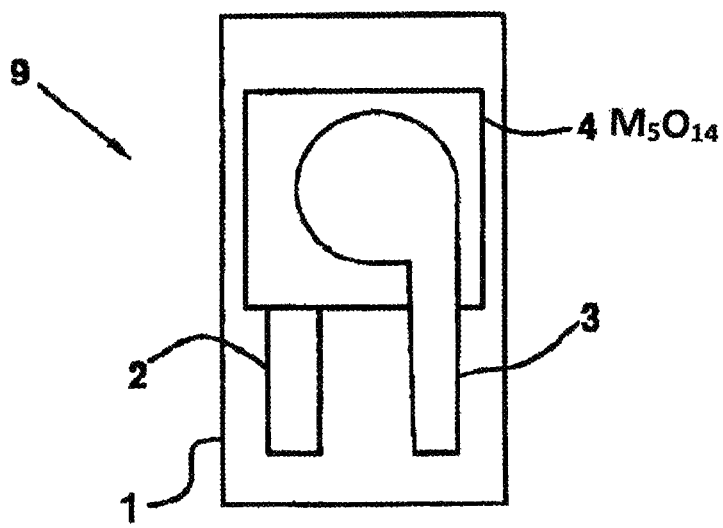

FIG. 2 shows (in plan view) an insulating substrate 1, for example an alumina or ceramic tile, upon which is formed a first electrode 2, for example of gold, a vapor sensitive material layer 4 comprising a vapor sensitive material in accordance with the present invention and a second electrode of gold.

A parallel plate sensor 9, as shown in FIG. 2, may be fabricated by applying the first electrode 2 of gold to the insulating substrate 1 by screen printing or sputtering and a vapor sensitive material layer 45 by deposition by screen printing or doctor blading from a suspension or a colloidal dispersion and firing at a temperature in the range 450-950° C. to promote adhesion and mechanical integrity. A second electrode 3 of gold is formed on the vapor sensitive material layer 4 by screen printing or sputtering.

Figure 3:
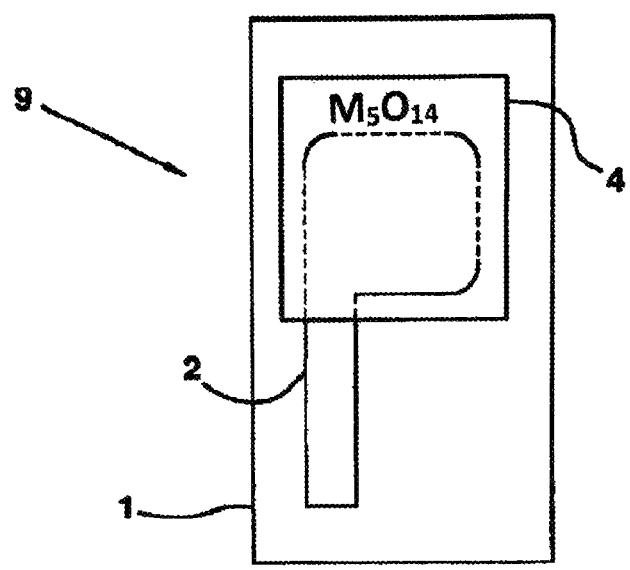

FIG. 3 shows a parallel plate sensor 9 of the type shown in FIG. 2 partially completed, inasmuch as the second electrode 3 has not been formed. FIG. 3 shows the insulating substrate 1, the first electrode 2, and the vapor sensitive material layer 4. The portion of the first electrode 2 covered by the vapor sensitive material layer 4 may preferably extend in area to substantially the same extent as the second electrode 3.

The first electrode 2 and second electrode 3 are connected to an electrical measuring means for measuring the resistance and/or capacitance, and/or impedance of the vapor sensitive material layer 4, and the sensor is contacted with air or a gas or gaseous mixture which may contain a vapor of a volatile organic compound. The resistance and/or capacitance, and/or impedance is measured by the electrical measuring means, and changes in the concentration of the vapor are observed and measured as changes in the resistance, capacitance, and/or impedance recorded by the electrical measuring means.

Figure 4:
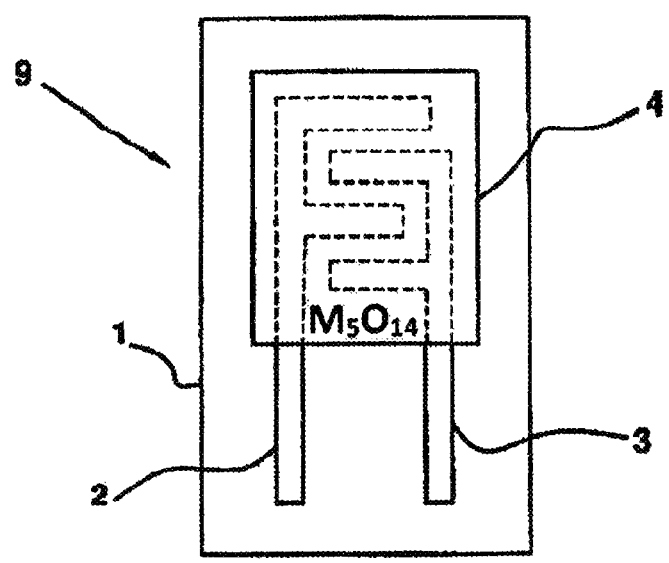

FIG. 4 shows an insulating substrate 1, an alumina ceramic tile, upon which are formed electrodes 2 and 3, both of gold, and a vapor sensitive material layer 4. Portions of the first electrode 2 and second electrode 3 covered by the vapor sensitive material layer 4 are interdigitated.

Sensors composed of the vapour detecting materials are selective in that they display virtually no response to changes over a wide range of relative humidity, along with very little response to the presence of oxidizing gases.

Figure 5:
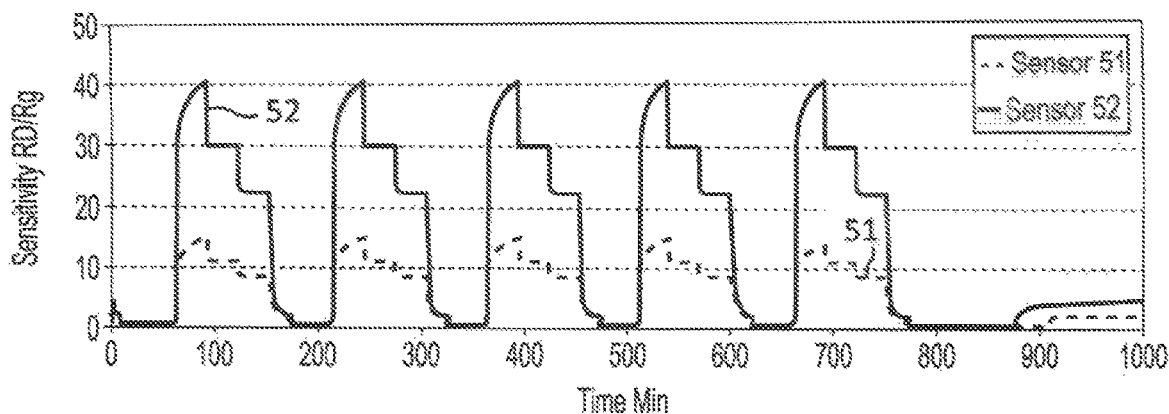
FIG. 5 shows sensitivity of two tantalum-doped $Mo_5O_{14}$ sensors to repeated exposures to a sequence of concentrations of 20 ppm, 10 ppm and 5 ppm isobutylene in air.

FIG. 5 shows sensitivity of two tantalum-doped $Mo_5O_{14}$ sensors to repeated exposures to a sequence of concentrations of 20 ppm, 10 ppm and 5 ppm isobutylene in air. The two sensors, sensor 51 and sensor 52, are both made from similar vapor sensitive material. The difference in output is due to the difference in thickness of the vapor sensitive material. The data clearly illustrate the very high sensitivity of the material. Sensitivity indicated on the y-axis or ordinate of FIG. 1 is effectively the resistance Ro of the sensing element in clean air divided by the sensing element's resistance Rg when it is exposed to the target vapor.

Figure 6:
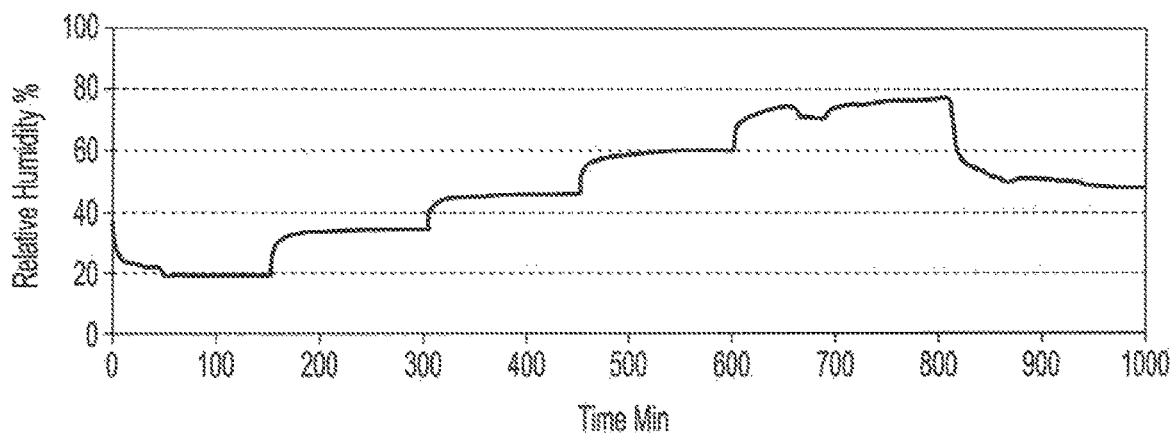
FIG. 6 shows relative humidity changes during the time periods shown in FIG. 5.

FIG. 6 shows relative humidity changes during the time periods shown in FIG. 1.

Figure 7:
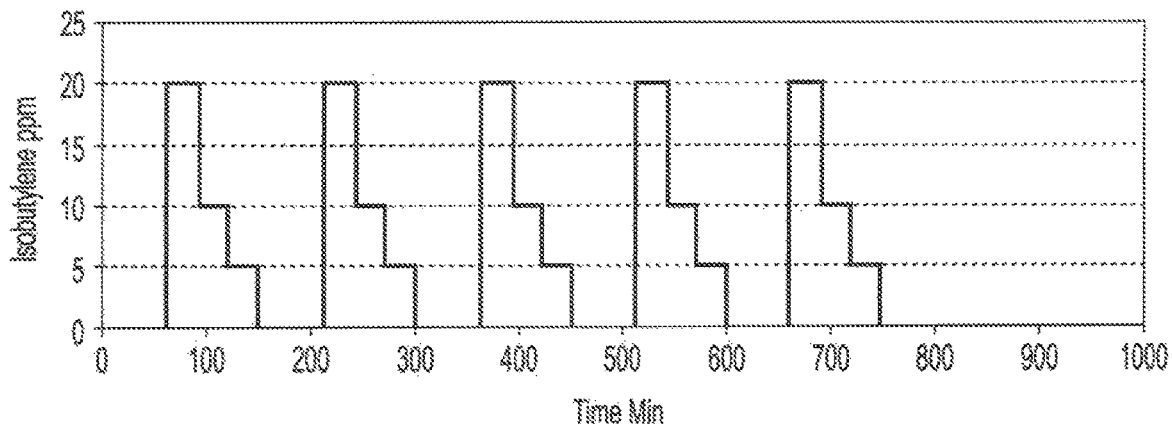
FIG. 7 shows the varied ratio of isobutylene in the air at the time periods shown in FIG. 5.

FIG. 7 shows the varied ratio of isobutylene in air at the time periods shown in FIG. 1. The isobutylene to air ratio was periodically reduced from 20 ppm, to 10 ppm, to 5 ppm and then to zero ppm. At about 750 minutes the isobutylene supply was terminated.

While the invention has been described with reference to specific embodiments, modifications and variations of the invention may be constructed without departing from the scope of the invention, which is defined in the following claims.

We claim:

1. An apparatus comprising a sensor for detecting vapors of organic compounds, comprising plural electrodes, a single layer of vapor sensitive material in contact with each of the plural electrodes, the vapor sensitive material being molybdenum oxide doped with sufficient vanadium, niobium, tantalum or titanium to form a stable $M_5O_{14}$ theta phase crystal structure, where M is predominantly molybdenum and which exhibits a response in a form of an increase or a decrease in an electrical property of the vapor sensitive material in presence of a vapor of a volatile organic compound.

2. The apparatus of claim 1, wherein the sensor detects vapor of a liquid volatile organic compound.

3. The apparatus of claim 2, wherein the sensor detects ppm concentrations of isobutylene vapor in air.

4. A method comprising effecting determination of a presence of a vapor of a volatile organic compound which comprises providing a vapor sensor, providing plural electrodes, providing a single layer of vapor sensitive material and each of the plural electrodes in contact with the vapor sensitive material, wherein providing the vapor sensitive material comprises providing molybdenum oxide doped with sufficient vanadium, niobium, tantalum or titanium to form a stable $M_5O_{14}$ theta phase crystal structure, where M is predominantly molybdenum, wherein the vapor sensitive material exhibiting a response in the form of increasing or a decreasing in an electrical property of the vapor sensitive material in the presence of the vapor of the volatile organic compound by detecting the change in the electrical property of the vapor sensitive material, measuring the change in the electrical property and determining a concentration of the vapor of the volatile organic compound.

5. The method of claim 4, further comprising sensing the vapor and determining the concentration of the vapor of the volatile organic compound in presence of humidity.

6. The method of claim 4, wherein the vapor is vapor of liquid organic compound.

7. The method of claim 4, wherein the measuring further comprises measuring resistance of the vapor sensitive material, measuring capacitance of the vapor sensitive material or measuring impedance of the vapor sensitive material.

8. The method of claim 4, further comprising determining a concentration of the vapor of the organic compound in the presence of air and humidity.

9. The method of claim 4 comprising determining concentration of isobutylene.

10. The method of claim 4 comprising determining concentration of benzene in air.

* * * * *